April 30, 1968   W. LORECK   3,380,571
ROUND LINK CHAIN FOR CHAIN CONVEYORS
Filed Sept. 27, 1966
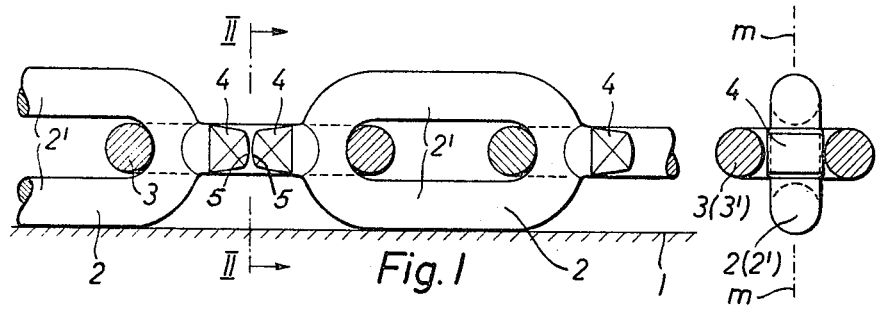
Fig. 1
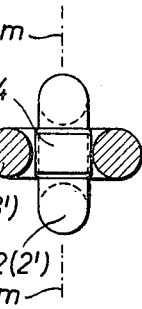
Fig. 2
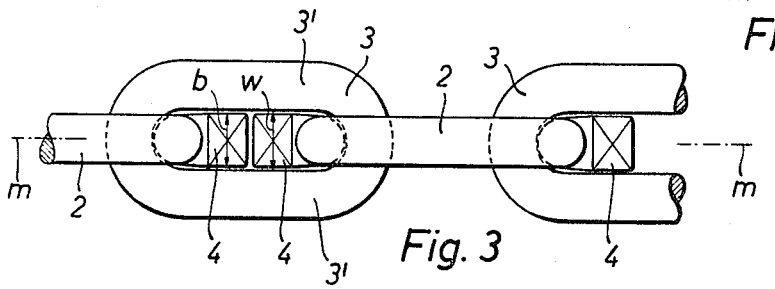
Fig. 3
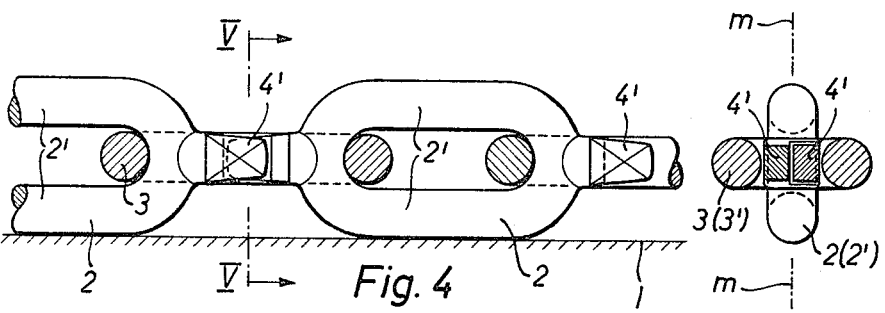
Fig. 4
Fig. 5
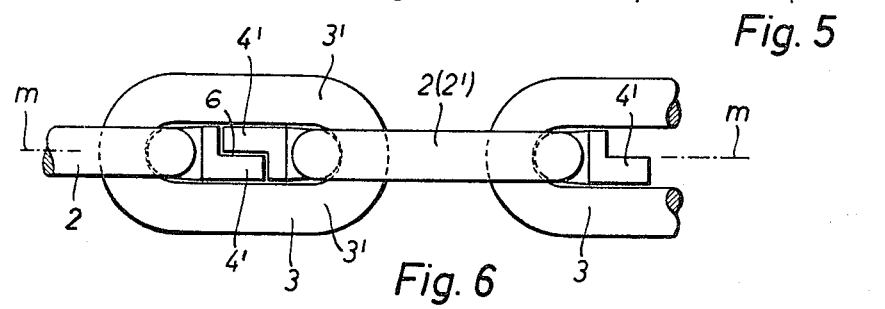
Fig. 6
INVENTOR:
WERNER LORECK
BY
Burgess, Dinklage & Sprung
ATTORNEYS

# 3,380,571
ROUND LINK CHAIN FOR CHAIN CONVEYORS
Werner Loreck, Dorstener Str. 344,
Wanne-Eickel, Germany
Filed Sept. 27, 1966, Ser. No. 582,415
Claims priority, application Germany, Oct. 2, 1965,
L 51,772
6 Claims. (Cl. 198—168)

The invention relates to a round link chain for chain conveyors, especially for chain conveyors for mining purposes, with projecting parts protruding from the curved sections of every second chain link and bridging the interposed chain link of ordinary shape.

A certain round link chain of that type has little projecting parts protruding from the curved sections of the chain link in some way. This chain is not rigid however in the longitudinal direction of the chain and can be shoved together when it is not under tensile stress. As the projecting parts protrude in this case out of the longitudinal plane of the chain link the conventionally shaped sprocket wheels cannot be used. The manufacture of these specially shaped chain links is considerably difficult too.

Another known round link chain of the initially described type and with scraper flights attached on one side to the chain has projections on the longitudinal leg of the horizontal chain links on the side facing the scraper. Under working conditions these projections or lugs bear either on each other or on the adjacent vertical chain links. This chain is only deflectable in one direction necessary for passing over the sprocket wheel. It cannot be deflected within the same plane into the opposite direction. But there are no means provided to prevent deflection of the chain in other directions or shoving together of the chain up into a pile where the chain is under no tensile stress.

The invention refers to a round link chain of the type described above and avoids the drawbacks mentioned in that in a straight aligned position of the chain the projecting parts of every second chain link are positioned only with little clearance and entirely within the inner space between the two parallel longitudinal legs of the ordinarily shaped chain link.

The round link chain is therefore rigid as well relative to the plane of the rotating sprocket wheel as in the longitudinal direction of the chain. It can resist all pushing forces that can occur under working conditions without deflecting in any direction. It passes easily over the sprocket wheels of the usual type and, above all, cannot be shoved up into a pile if broken. This piling up of a broken chain of a one- or two-chain conveyor in inclined coal seams results very often in damages with regards to material and injury with regard to personnel. It is of course also a difficult task under these circumstances to extricate the broken and entangled chain when the chain conveyor is to be repaired.

With regards to one-chain conveyors the chain according to the invention has the advantage of providing the necessary rigidity or stability without the otherwise required high pre-tensioning of the chain.

Preferably the front surfaces of the projecting parts of the chain links according to the invention are slightly curved in order to make the length of the projecting parts as great as possible without detracting in any way from the necessary flexibility of the chain when it passes around the sprocket wheel.

The round link chain according to the invention can also be modified in such way that the projecting parts partly overlap and engage each other. Preferably the projecting parts have a vertical right-angled separation-joint. Thus the projecting parts attain their greatest possible length and thereby their greatest rigidity.

Hereafter a preferred embodiment and another modification of the invention are described in greater detail.

FIG. 1 shows the chain according to the invention partly in section and in side elevation, FIG. 2 represents a cross sectional view of the chain taken along the line II—II in FIG. 1 and seen in the direction of the respective arrows.

FIG. 3 is a plan view of the chain of FIG. 1,

FIG. 4 refers to another modification of the invention represented in the same way as in FIG. 1, FIG. 5 represents a cross sectional view of the modified chain taken along the line V—V in FIG. 4 and seen in the direction of the respective arrows, and FIG. 6 is a plan view of the chain of FIG. 4.

The endless round link chain 2, 3 moves over the bottom plate 1 of the channel of the conveyor and within the plane of rotation $m$—$m$, which is, for example, the vertical middle plane of the channel in case of a one-chain conveyor. At both opposite ends of such a conveyor sprocket wheels are provided around which the chain is deflected and drawn by a drive unit. At regular distances scraper flights (not shown) are attached to the chain which move the bulk material lying in the channel for conveying purposes.

The round link chain consists of the chain links 2 with the legs 2', 2' in the plane of rotation $m$—$m$ and of the ordinary chain links 3 with the legs 3', 3' disposed at a right angle to the above mentioned plane $m$—$m$ in alternating sequence.

The chain links 2 have at the exterior side of both curved sections lengthwise protruding lugs or projecting parts 4 of a width $b$, which is a little less than the clearance $w$ between the legs 3', 3' of the following ordinarily shaped chain link 3. Thus the projecting parts 4 have little clearance or free play between the legs 3', 3' of the conventional chain links 3 and bear against these legs if crosswise acting forces are applied to the chain. Under these conditions obviously the deflection of the chain out of its plane of rotation and the disadvantage related thereto are avoided even if only a small tensile force is applied in the longitudinal direction of the chain.

The opposing front surfaces 5 of the projecting lugs 4 are slightly curved so as to permit deflection of the chain when passing around the sprocket wheel whereas the lugs are of the utmost possible length.

The modification described in FIG. 4 to 6 differs from the preferred embodiment dealt with above only with regards to the shape of the projecting parts 4 of the chain links 2.

In this case the lugs 4' projecting at the outermost portion of the curved sections of the links 2 in the longitudinal direction thereof overlap and engage each other and form thereby a vertical right-angled separation-joint 6 as can easily be seen in FIG. 6. The lugs 4' thus form extremely long lever arms with good leverage which bear against the legs 3', 3' of the conventionally shaped chain link 3 and thus stiffen perfectly the chain.

What is claimed is:
1. Link chain which comprises alternating first and second links interconnected to form a chain capable of extending in a longitudinal axial direction, said first links having a lug projecting from each corresponding outer end thereof and dimensioned to occupy when said chain is in said axial direction substantially the width of the adjacent space defined within the next corresponding second link thereat as well as a portion of the length of such space, the remaining portion of the length of such space being occupied correspondingly by the appropriate opposing lug of the next successive first link, said chain when in said longitudinal axial direction having only slight longitudinal clearance between the outermost portions of the opposing lugs occupying the common space of a corresponding second link and only slight lateral clearance between each said lug and the corresponding portions of said second link thereat.

2. Chain according to claim 1 wherein said lugs are slightly curved at their front surface.

3. Chain according to claim 2 wherein the opposing lugs occupying the common space of a corresponding second link engage each other in partial overlapping disposition.

4. Chain according to claim 3 wherein said opposing lugs together define a substantially vertical surface right angle separation joint.

5. Chain according to claim 2 wherein said links have a substantially circular cross-section, arcuate outer ends, and parallel legs interconnecting said arcuate outer ends, and said first links have lugs of substantially equal length whereby to occupy respectively about one-half of the common space of the appropriate second link.

6. Chain according to claim 1 which comprises a substantially fixed longitudinal length chain composed of alternating first and second links interconnected to form a chain capable of extending in an axially aligned longitudinal direction, said first links having lugs projecting outwardly in the longitudinal direction from the corresponding outer end portions thereof and occupying substantially and being situated substantially within the width of the space defined within the correspondingly adjacent second link thereat and operatively occupying substantially the adjacent half of the length of such space, such that the remaining half of the length of said space is correspondingly occupied by the appropriate opposing lug of the next adjacent first link, with only slight clearance in the longitudinal direction being defined between the outermost portions of the opposing lugs occupying the common space of a corresponding second link and with only a slight clearance in the lateral direction being defined between each of said lugs and the corresponding portions of said second link thereat.

References Cited
UNITED STATES PATENTS 2,196,609  4/1940  Redler _____ 198—168

EDWARD A. SROKA, *Primary Examiner.*